United States Patent [19]
Nakano et al.

[11] Patent Number: 4,791,497
[45] Date of Patent: * Dec. 13, 1988

[54] APPARATUS FOR RECORDING AND/OR REPRODUCING, IN SUCCESSIVE SLANT TRACKS ON A RECORD TAPE, AT LEAST AN AUDIO SIGNAL AND AN INDEX SIGNAL FOR CONTROLLING TAPE TRANSPORT

[75] Inventors: Kenji Nakano; Hiroshi Okada; Takao Takahashi, all of Tokyo, Japan

[73] Assignee: Sony Corp., Tokyo, Japan

[*] Notice: The portion of the term of this patent subsequent to Sep. 20, 2005 has been disclaimed.

[21] Appl. No.: 885,203

[22] Filed: Jul. 14, 1986

[30] Foreign Application Priority Data

Jul. 19, 1985 [JP] Japan .................................. 60-159736
Jul. 22, 1985 [JP] Japan .................................. 60-161438

[51] Int. Cl.$^4$ .......................... G11B 5/09; G11B 20/10
[52] U.S. Cl. ........................................... 360/32; 360/48
[58] Field of Search ..................... 360/72.2, 48, 32, 49

[56] References Cited

U.S. PATENT DOCUMENTS 4,120,006 10/1978 Nagami et al. .......................... 360/49
4,496,997 1/1985 Ohtsuki .
4,533,963 8/1985 Nakano et al. .
4,558,378 12/1985 Shibata et al. .
4,575,772 3/1986 Shimada et al. .
4,641,208 2/1987 Inazawa et al. .

FOREIGN PATENT DOCUMENTS 0184190 6/1986 European Pat. Off. .
0208536 1/1987 European Pat. Off. .

OTHER PUBLICATIONS

Japanese Patent Abstract No. 58-80144 (A) (Azuma).
Japanese Patent Abstract No. 60-45975 (A) (Kobayashi).

Primary Examiner—Raymond F. Cardillo
Assistant Examiner—Kevin J. Fournier
Attorney, Agent, or Firm—Alvin Sinderbrand

[57] ABSTRACT

In an apparatus for recording and/or reproducing, in successive slant tracks on a record tape, an information signal comprised of at least an audio signal and an index signal for use in controlling transportation of the tape; the input audio signal is converted to a digitized form in which the audio data for a predetermined length of time is grouped as a plurality of data blocks which are recorded by a rotary head in a first part of a respective slant track on the tape, an index signal generator provides a coded index signal to indicate respective input information, such as, an absolute tape-position address counted from a predetermined reference position on the record tape, an index area signal is generated in predetermined timed relation to scanning by the rotary head of said first part of each slant track, and a control is responsive to the index area signal for supplying the coded index signal to a rotary head for recording by the latter in a second part of said respective slant track which is located adjacent an end of said first part of the respective slant track.

14 Claims, 8 Drawing Sheets

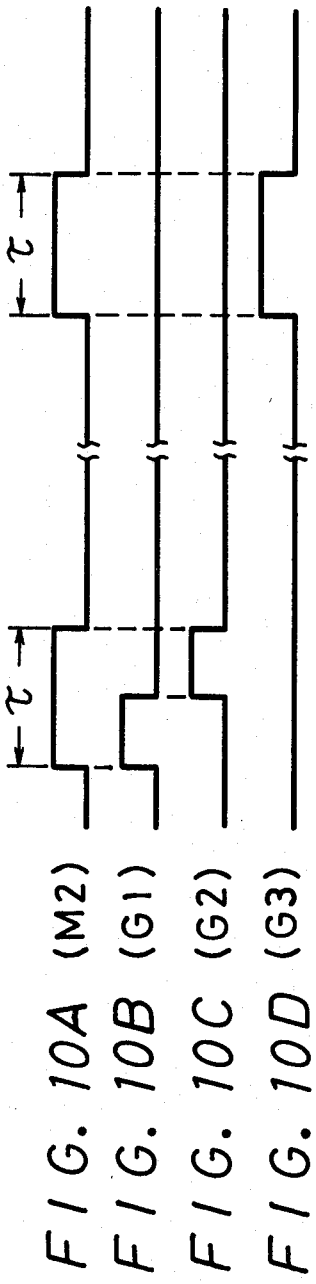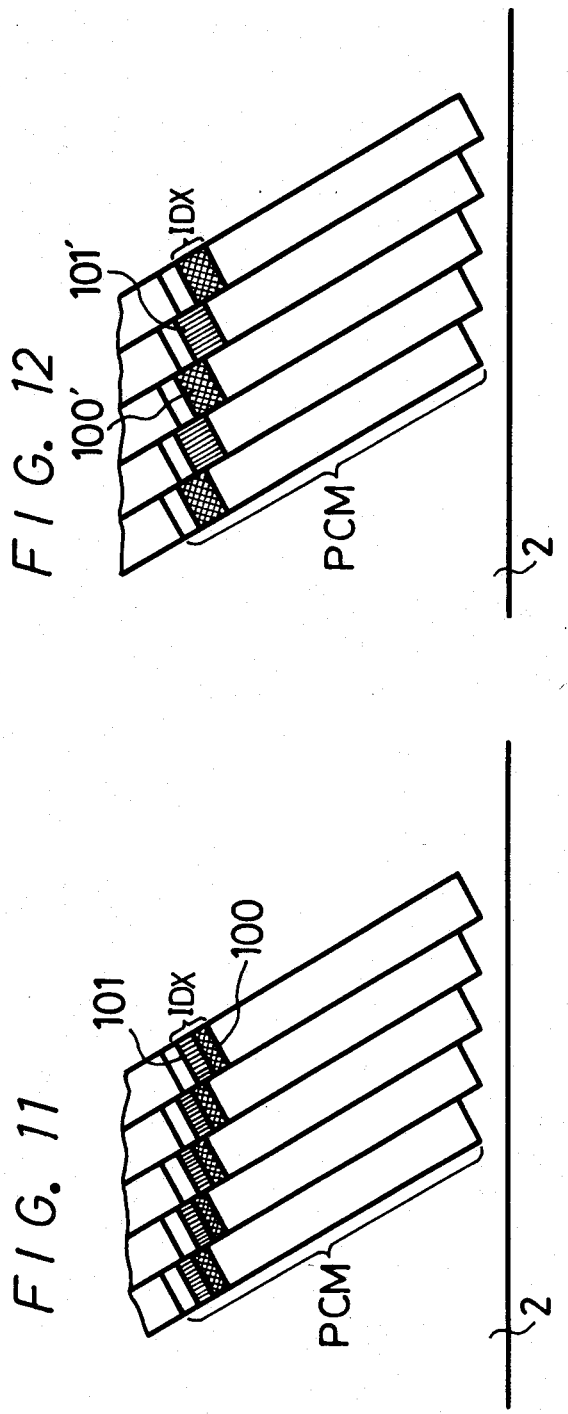
FIG. 10A (M2)
FIG. 10B (G1)
FIG. 10C (G2)
FIG. 10D (G3)
FIG. 11
FIG. 12

APPARATUS FOR RECORDING AND/OR REPRODUCING, IN SUCCESSIVE SLANT TRACKS ON A RECORD TAPE, AT LEAST AN AUDIO SIGNAL AND AN INDEX SIGNAL FOR CONTROLLING TAPE TRANSPORT

BACKGROUND OF THE INVENTION

1. Field of the Invention

This invention relates generally to an apparatus for recording and/or reproducing a video signal and a PCM (pulse-code modulated) audio signal in slant tracks on a record tape by means of a rotary head, and more particularly is directed to an apparatus for recording an index signal, such as, a signal indicative of the position along the tape of a starting point of a recorded event or program.

2. Description of the Prior Art

In accordance with the international standardization thereof, an 8 mm video tape recorder (VTR) can be used in a normal recording mode in which an audio signal is frequency modulated prior to being mixed with a color video signal and then recorded in such a way that the audio signal can be frequency separated from the color video signal upon playback. Further, an optional recording mode can be employed in which the audio signal is pulse-code modulated and recorded in a so-called overscan area which is separate from the main area of each oblique track in which the color video signal is recorded. This latter mode is hereafter referred to as the normal PCM mode.

As is shown on FIG. 1, a rotary head assembly of a typical 8 mm video tape recorder includes recording and reproducing rotary magnetic heads HA and HB. These rotary magnetic heads HA and HB have gaps with different azimuth angles and are mounted on a rotary drum 1 with an angular spacing of 180° therebetween. Rotary heads HA and HB are rotated at a rotational speed equal to the standard frame frequency (30 Hz) in the direction indicated by arrow 3H and protrude slightly from the peripheral surface of the rotary drum 1. A magnetic tape 2 is wrapped around the peripheral surface of rotary drum 1 over an angular extent of 221° and is suitably transported at a constant speed in the direction indicated by an arrow 3T.

Accordingly, tracks 4A and 4B, each having a length corresponding to an angular extent of 221° on the surface of drum 1, are alternately formed on tape 2 by rotary heads HA and HB, respectively, as shown in FIG. 2. In a so-called overscan area AP of each track having an angular extent of 36° measured from a point at which the rotary head HA or HB starts scanning the track 4A or 4B, there is recorded an audio signal corresponding to one field period of the video signal and which has been pulse-code modulated and time compressed. On the succeeding main area AV of each track having an angular extent of 180°, there are recorded a color video signal of one field period, an FM (frequency modulated) audio signal of one field and tracking pilot signals, respectively. The remaining area of each track which has an angular extent of 5° is assigned as a spare area in which the head is disengaged from the tape.

Further, the PCM audio signal can be recorded and reproduced by the 8 mm video tape recorder in a so-called "multi-PCM" or "audio-use" mode in which, as disclosed in detail in U.S. Pat. No. 4,542,419, issued on Sept. 17, 1985 and having an assignee in common herewith, the main recording area AV of each track is also used for recording the PCM audio signal. In such audio-use or multi-PCM mode, the 8 mm video tape recorder becomes exclusively a PCM audio signal recording and/or reproducing apparatus in which PCM audio signals can be recorded in multiple channels. More specifically, as shown on FIG. 3, in the audio-use or multi-PCM mode, the area AV of each track corresponding to the angular range of 180° is divided equally by 5 and the PCM audio signal is recorded in a selected one of these divided portions during scanning of each track. Therefore, the whole area of each track shown on FIG. 2, including the area AP and the area AV, is divided into 6 track areas AP1 to AP6, each corresponding to an angular range or extent of 36°, and first to sixth track channels are formed by the same numbered segments or track areas AP1 to AP6 of the respective skewed tracks 4A,4B,4A, 4B, etc., shown on FIG. 3, whereby a suitably time compressed PCM audio signal can be recorded in any desired channel. For example, the PCM audio signal may be recorded first in the segments or track areas AP1 of the successive tracks 4A,4B, from one end of the tape to the other. Thereafter, the PCM audio signal may be further recorded in segments or track areas AP2 of the successive tracks from one end of the tape to the other. Accordingly, PCM audio signals can be recorded in and reproduced from each of the six channels with the result that, in the audio-use or multi-PCM mode shown on FIG. 3, the tape 2 has an audio recording time or capacity six times as long as when a PCM audio signal is recorded only in the overscan area AP of each track, as on FIG. 2.

In the case of the multi-PCM mode, the PCM signal processing circuit used for each of the multiple channels may be the same signal processing circuit provided for processing the PCM audio signal recorded in the single channel constituted by the track areas AP in the prior art 8 mm video tape recorder.

The track format of the above mentioned 8 mm video tape recorder in its normal PCM mode will now be described more fully with reference to FIG. 4, in which contact of the rotary head with the tape 2, that is, the starting point of the track, begins at the right-hand side where there is provided a tracing starting area 11 corresponding, in extent, to a 5° rotation angle of a rotary head. At the rear or trailing portion 12 of tracing starting area 11, a period having an angular range or extent of 2.06° and corresponding to three horizontal periods (3H) of the video signal, is assigned as a preamble area which will become a clock run-in area synchronized with the succeeding PCM data. Following the preamble or clock run-in area 12, there is provided a PCM data recording area 13 having an angular extent of 26.32° and in which a time compressed PCM audio signal is recorded. A postamble area 14 also having an angular extent of 2.06° (3H) follows the PCM data recording area 13 so as to be used as a back margin area to cope with the displacement of the recording position when the recording is carried out in the so-called after-recording mode. A next area 15 having an angular extent of 2.62° is assigned as a guard band area for separating the video signal area 16 which follows from the PCM data area 13. The video recording area 16 has an angular range or extent of 180° as earlier noted for receiving the recorded video signal of one field period. Next to the area 16, there is provided a head disengaging area 17 having an angular extent of 5° and in which the rotary head is disengaged or separated freely from the magnetic tape.

A track format used in the multi-PCM mode will now be described with reference to FIG. 5 in which it is shown that the format for each segment track area accommodating the PCM audio signal is exactly the same as the format for the PCM audio area AP in the normal PCM mode of the 8 mm video tape recorder. Thus, each segment track area in FIG. 5 is formed of a tracing starting area 21, a preamble area 22, a PCM data area 23, a postamble area 24 and a guard band area 25. he same format is assigned to each of the segment track areas AP1 to AP6 on FIG. 3.

Generally, the PCM data is recorded on the tape with the binary code data having a logic level "1" or "0" being modulated to signals of respective frequencies. In the 8 mm video tape recorder, for example, the data having the logic level "1" is modulated to, or represented by a signal having a frequency of 5.8 MHz which is recorded, while the data having the logic level "0" is modulated to, or represented by a signal having a frequency 2.9 MHz which is recorded. In the prior art, for example, U.S. Pat. No. 4,551,771, issued Nov. 5, 1985, only the data having the logic level "1", that is, a single frequency signal having the frequency 5.8 MHz, is recorded in each preamble area 12 or 22 and in each postamble area 14 or 24.

A so-called program search method for locating a starting point of an event or program recorded by the 8 mm video tape recorder in the normal PCM mode and the multi-PCM mode has been proposed by a person or persons having a duty of assignment to the assignee of the present application and is described in U.S. patent application Ser. No. 838,626, filed on Mar. 11, 1986. In accordance with such method, an index signal is recorded in, for example, the postamble area 14 or 24 of each track format described above, and this index signal is used to access the starting point of the respective recorded event or program on the tape. Moreover, the index signal can be recorded and/or reproduced by the rotary heads used for the color video and/or PCM audio signals so that stationary recording and reproducing heads are not required for the index signal. Further, since the index signal is recorded in an area 14 or 24 separated from the track areas 13 or 23 and 16 for recording of the PCM data and the video signal, respectively, it is possible to insert or erase the index signal in an after-recording mode.

The index signal may be formed, if it is merely to represent a relative position on the tape, that is, if the index signal is merely indicative of the starting point of a tune, event, program or the like, such that the index signal can be discriminated from the video signal and the PCM audio data which make up the information signal recorded on the tape. In the above-mentioned example, a postamble signal in postamble area 14 is a single tone signal having a frequency of 5.8 MHz and corresponds to PCM data of all "1"s. Therefore, an index signal which can be readily discriminated from this postamble signal and which has a very small probability of appearing as a PCM audio data can be a single tone signal having a frequency of 2.9 MHz and which corresponds to data consisting of all "0"s. In such case, the index signal generator can be simplified and provided at low cost so that it can be used in a relatively inexpensive version of a popular recording and/or reproducing apparatus.

However, in the case where only relative position information is provided, as aforesaid, the actual position along the tape can be determined from such relative position information only by counting the number of the index signals as the tape is searched from its head or leading end. However, if a tape cassette is ejected from a video tape recorder and then loaded therein again, when the starting point of a recorded event is searched beginning from a point midway between the ends of the tape, it is impossible to know the count of the first detected index signal measured from the head end of the tape. Accordingly, the user must learn the position of the first detected index signal by reproducing the recorded signals before and after such index signal.

Particularly in the case of the above-mentioned multi-PCM mode, the number of tunes and the positions of the starting points of the tunes may be different in each of the segment tracks or channels. Accordingly, after the index signals are counted from the tape head end for searching the tunes or programs in one of the segments tracks or channels, when a tune recorded in a predetermined sequential order from the head end of the tape is searched for in another or new segment track or channel, the user must rewind the tape up to its head end and then count index signals while searching for the desired tune in the new channel. Thus, accessing the starting point of a recorded tune, program or event on the tape becomes very complicated.

OBJECTS AND SUMMARY OF THE INVENTION

Accordingly, it is an object of this invention to provide an improved apparatus for recording and/or reproducing an information signal and which avoids the above-mentioned problems encountered with the prior art.

It is another object of this invention to provide an improved apparatus for recording and/or reproducing an information signal and which can very easily and positively access the starting point of a recorded event or program on a record tape.

It is a further object of this invention to provide an improved apparatus for recording and/or reproducing an information signal, as aforesaid, and which can considerably reduce the time required to access the starting point of an event or program recorded on a tape.

It is still a further object of this invention to provide an apparatus for recording and/or reproducing information signals, including a video signal and/or an audio signal, along with a coded index signal which identifies the address of the starting point of a respective program or event, and which is compatible with other recording and/or reproducing apparatus using an index signal that can only provide information as to its relative position, for example, as by counting index signals from the head end of the tape.

According to one aspect of the present invention, an apparatus for recording and/or reproducing, in successive slant tracks on a record tape, an information signal comprised of at least an audio signal and an index signal for use in controlling transportation of the tape, comprises audio signal processing means for converting an input audio signal to a digitized form in which the audio data for a predetermined length of time is grouped as a plurality of data blocks, transducer means connected to said audio signal processing means for recording and/or reproducing the grouped data blocks containing the digitized audio signal for a predetermined length of time in a first part of a respective slant track on the tape, index signal generating means including means for generating a coded index signal to indicate respective input information, such as, the address of the starting point of a recorded program or event, index area signal generating means for providing an index area signal in predetermined timed relation to scanning by said transducer means of said first part of each said slant track, and control means responsive to said index area signal for supplying said coded index signal to said transducer means for recording by the latter in a second part of said respective slant track which is located adjacent an end of said first part of said respective slant track.

The above, and other objects, features and advantages of the present invention, will become apparent from the following detailed description of preferred embodiments which is to be read in conjunction with the accompanying drawings, and throughout which the same reference numerals are used to designate like elements and parts.

BRIEF DESCRIPTION OF THE DRAWINGS

FIGS. 10A to 10D are timing diagrams to which reference will be made in explaining the operation of the apparatus shown in FIG. 9; and FIGS. 11 and 12 are schematic diagrams illustrating the portions of successive slant tracks in which PCM audio signals are recorded, and which show respective different arrangements of coded and single frequency index signals recorded adjacent the PCM audio signals in accordance with this invention.

DESCRIPTION OF THE PREFERRED EMBODIMENTS

Figure 6:
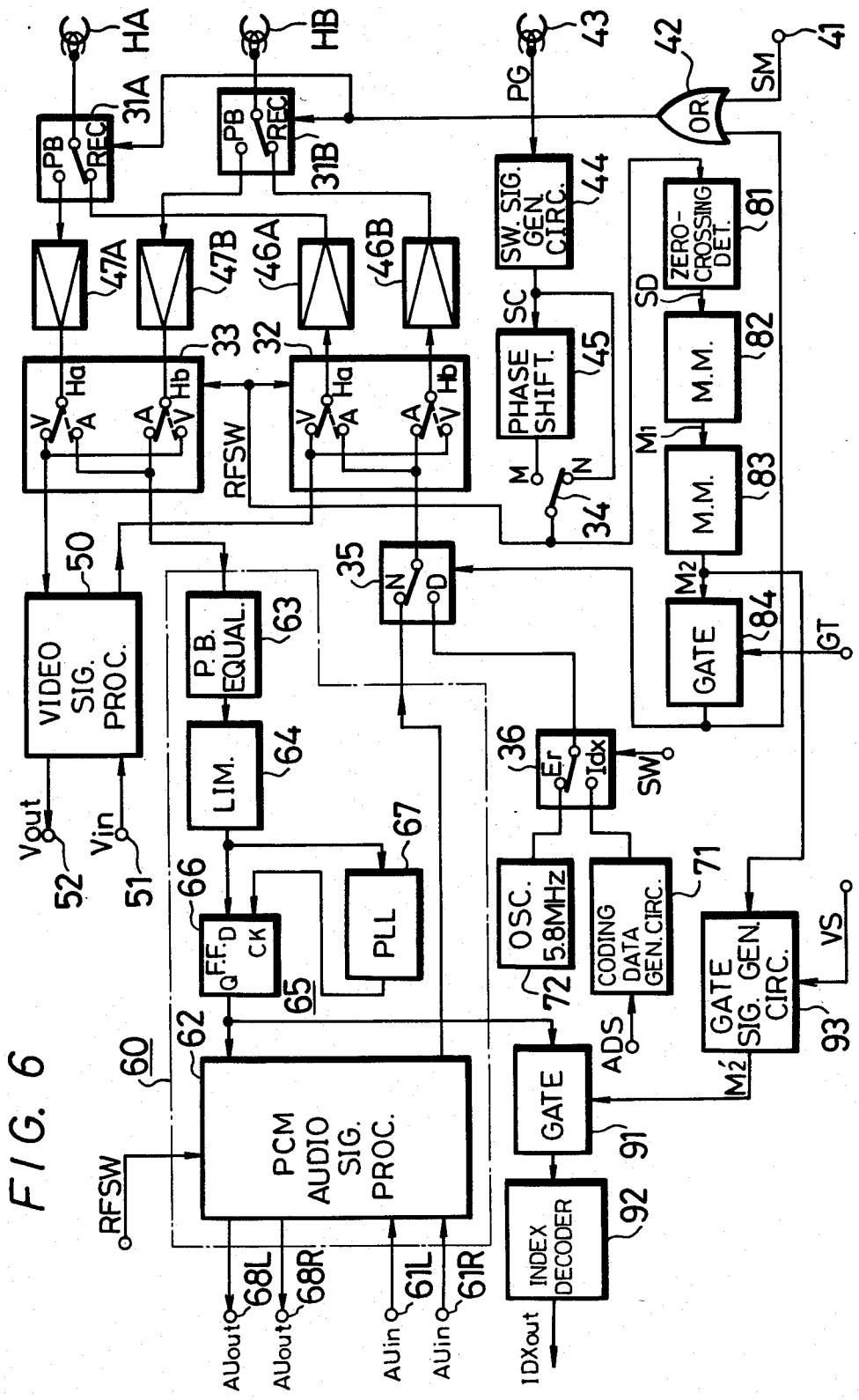
FIG. 6 is a schematic block diagram showing an apparatus for recording and/or reproducing an information signal according to an embodiment of this invention.

Referring in detail to FIG. 6, it will be seen that the apparatus there shown for recording and/or reproducing PCM signals according to this invention is applied to an 8 mm video tape recorder and includes recording and/or reproducing change-over switching circuits 31A and 31B to which a recording or reproducing switching signal SM from a terminal 41 is applied through an OR gate 42. Each of switching circuits 31A and 31B engages a recording terminal REC upon recording and is changed-over to engage a playback terminal PB upon reproducing.

Rotary head change-over switching circuits 32 and 33 are operated by head switching signal RFSW to be alternately disposed in the positions shown in full lines and in dotted lines respectively, at every ½ revolution of the rotary recording/reproducing heads HA and HB.

Figure 8:
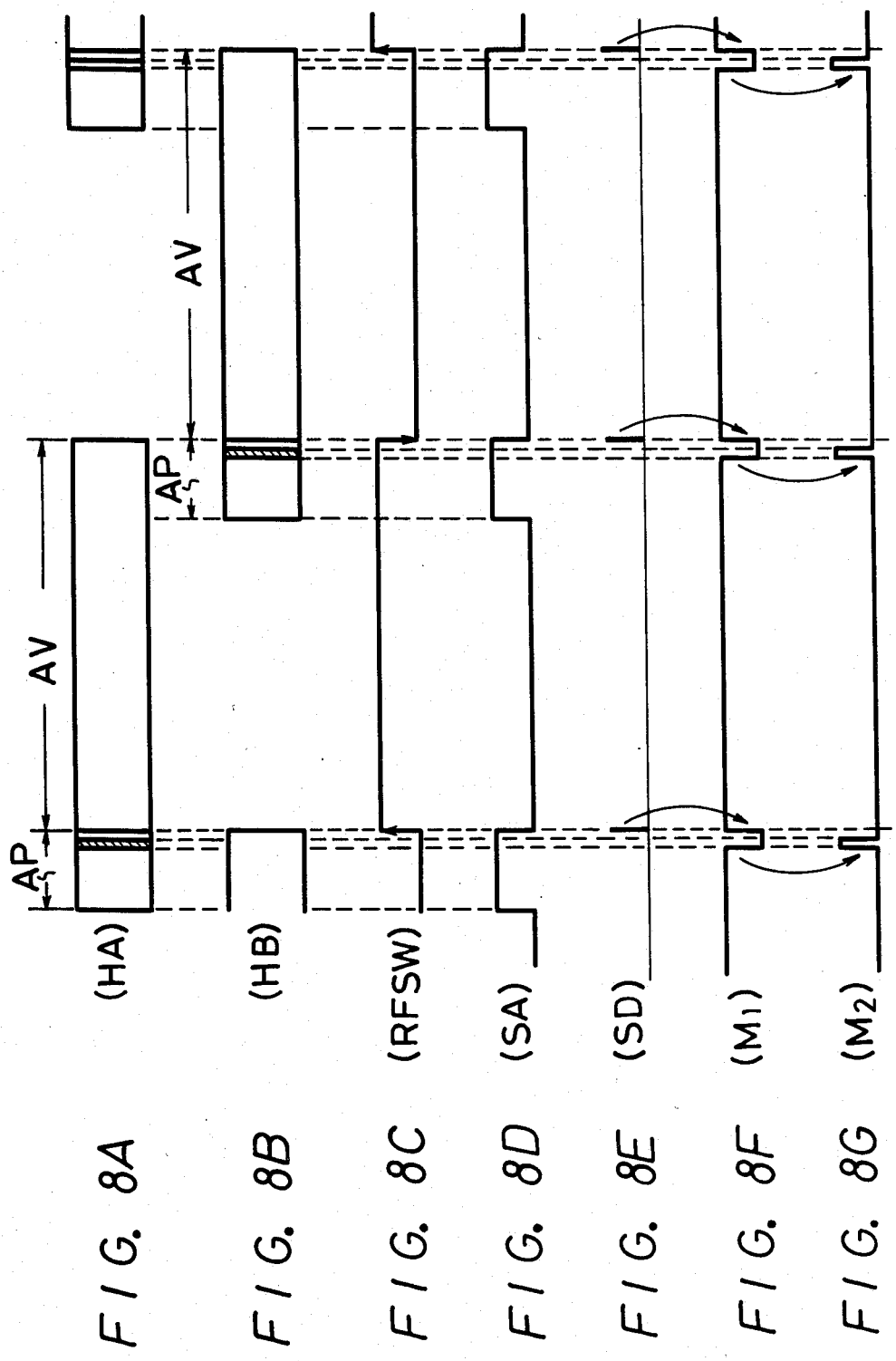
FIGS. 8A to 8G are timing diagrams to which reference will be made in explaining the operation of the apparatus shown on FIG. 6.

A switch 34 is provided to select the timing of switching signal RFSW for a normal PCM mode and a multi-PCM mode, respectively. More specifically, for the normal PCM mode, the movable contact of switch 34 is engaged with a terminal N, at which time, a pulse PG having a frequency of 30 Hz and being generated from a pulse generator 43 and indicative of the absolute rotary phase of rotary heads HA and HB is supplied to a switching signal generating circuit 44 from which a square wave signal SC having a duty ratio of 50% is derived. This square wave signal SC is supplied, as is, through switch 34 to switching circuits 32 and 33 as the switching signal RFSW (FIG. 8C).

For the multi-PCM mode, the movable contact of switch 34 engages a terminal M so that, at that time, square wave signal SC from the switching signal generating circuit 44 is supplied through a phase shifter circuit 45 by which, in accordance with the segment track area specified, the square wave signal SC is phase-shifted by $36° \times (n-1)$, in which n is an integer corresponding to the segment track area number, for example, n=1 for the segment track area AP1, n=2 for AP2, ... n=6 for AP6. The suitably phase-shifted signal from circuit 45 is supplied through switch 34 to switching circuits 32 and 33 as the switching signal RFSW for the multi-PCM mode. The switching signal RFSW is also supplied to a PCM audio signal processor 62 included in a PCM signal system 60 and which generates a PCM area signal indicative of the specified one of the segment track areas AP1–AP6. In response to such PCM area signal, data is read out of and/or written in a random access memory or RAM (not shown) during a period specified by the PCM area signal.

The normal PCM recording mode of the apparatus of FIG. 6 will now be described, as follows:

An input video signal $V_{in}$ applied to an input terminal 51 is supplied to a video signal system 50 in which it is suitably processed. The output signal from video signal system 50 is then supplied to switching circuit 32. With switch 34 engaging its contact N for selecting the normal PCM mode, switching circuit 32 is alternately switched by switching signal RFSW at every half revolution of rotary heads HA and HB which are controlled by a drum phase servo taking the pulse PG as a reference phase so that when rotary head HA scans the area AV of a track 4A described before in connection with FIGS. 2 and 4, the video signal is supplied through a recording amplifier 46A and switching circuit 31A to rotary head HA and is thereby recorded on this area AV of the respective track 4A. In like manner, when rotary head HB scans the area AV of a track 4B, the video signal is supplied through a recording amplifier 46B and switching circuit 31B to rotary head HB and is thereby recorded on the area AV of the respective track 4B.

Left and right channel audio signals $AU_{in}$ applied to input terminals 61L and 61R are both supplied to PCM audio signal processor 62 and are therein processed to PCM data.

The PCM data for one slant track is generally formed so that an information signal, such as, an audio signal and the like, having a constant time period, is divided into a plurality of blocks and a block synchronizing signal and a block address signal are added to each of the divided blocks.

Figure 7:
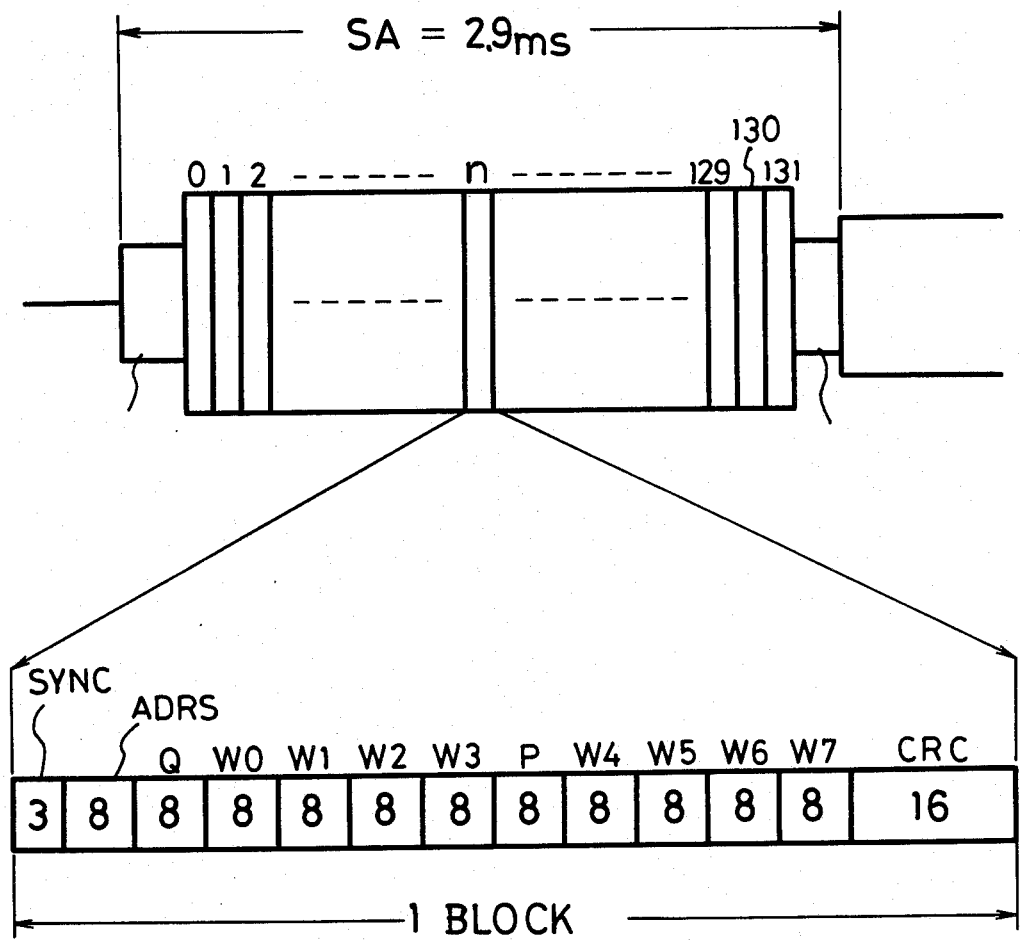
FIG. 7 is a schematic diagram to which reference will be made in explaining the arrangement of the PCM data.

In the PCM audio data of the 8 mm video tape recorder, as shown in FIG. 7, the data of one track area AP or $AP_1$–$AP_6$ is formed of 132 blocks and each block is formed of a block synchronizing signal SYNC of 3 bits, a block address word ADRS of 8 bits, error correction parity words P and Q each of 8 bits, audio data words W0 to W7 each of 8 bits, and an error detection CRC (cyclic redundancy check) code of 16 bits. The CRC code is generated for the words from address word ADRS up to data word W7 (see European Patent Laid-Open Publication No. 94671, published on Nov. 23, 1983 and corresponding to U.S. patent application Ser. No. 494,325, filed on May 13, 1983, and having a common assignee herewith). The address word ADRS indicates the block number for each block of data recorded in one track.

Figure 1:
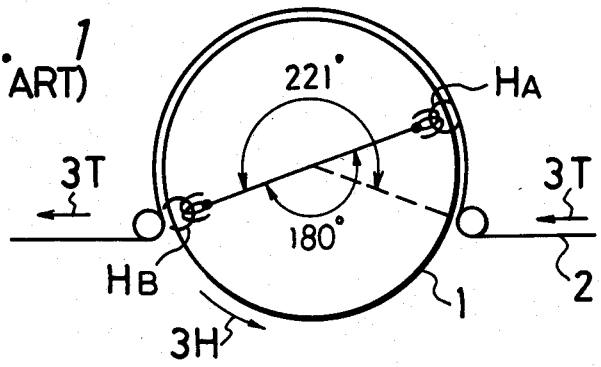
FIG. 1 is a schematic diagram showing a known rotary head assembly of a recording and/or reproducing apparatus to which the present invention may be advantageously applied.
Figure 2:
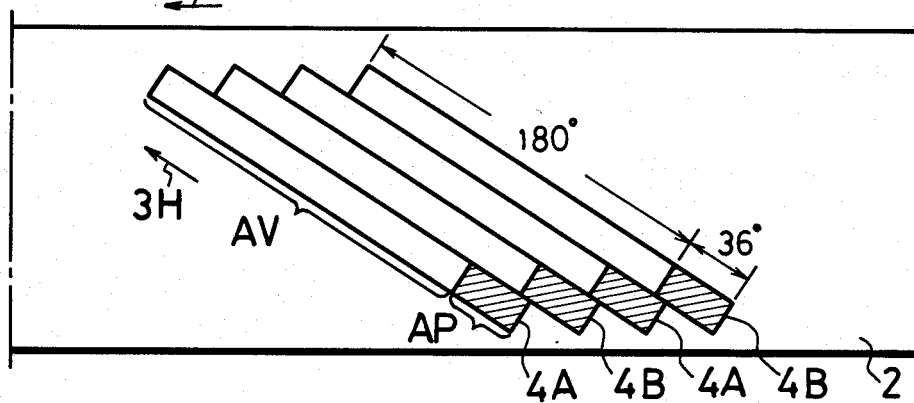
FIGS. 2 and 3 are schematic diagrams showing recording track patterns formed by the rotary head assembly of FIG. 1 for different recording modes thereof.

In other wods, the audio signal is digitized, the resulting digital signal is divided into 132 blocks for each field period thereof, the parity words P and Q, each of which is an error correction code, are generated, and the CRC code is generated for each block. Then, the data of one field period is time compressed to about 1/5 its original duration by a PCM area signal SA (FIG. 8D) formed on the basis of the switching signal RFSW, the block synchronizing signal SYNC and the block address signal ADRS are added to each block, and each block is formed as shown on FIG. 7 and is then read as one of the blocks in the sequence there shown. The PCM data thus read are modulated to a signal having a frequency of 5.8 MHz if the data is "1" and to a signal having a frequency of 2.9 MHz if the data is "0". The modulated signal is supplied from PCM audio signal processor 62 through a switching circuit 35, whereby, in response to the changing-over of switching circuit 32 by switching signal RFSW, the modulated PCM audio signal is recorded in the area AP of a track 4A by rotary head HA and in the area AP of a track 4B by rotary head HB, as shown in FIG. 2.

In the multi-PCM mode, the movable contact of switch 34 is engaged with its contact M to thereby allow phase shifter circuit 45 to generate a head switching signal RFSW whose phase is shifted by a whole multiple of 36° in accordance with a specified PCM area, and from which a PCM area specifying signal is derived. Accordingly, the PCM audio signal is recorded in a specified one of the segment track areas AP1 to AP6 shown in FIG. 3.

The reproducing mode of the apparatus will now be described. In the reproducing or playback mode, the rotary phase of the rotary drum is again servo-controlled on the basis of the pulse signal PG generated from pulse generator 43.

In the case of the 8 mm video tape recorder, tracking pilot signals (not shown) of a so-called 4-frequency system are periodically recorded on each of the tracks 4A and 4B so that, during reproducing, tracking servo is effected with reference to the 4-frequency system tracking pilot signals.

In the playback mode, the reproduced signal outputs from rotary heads HA and HB are respectively supplied through playback amplifiers 47A and 47B to switching circuit 33. Switching circuit 33 is changed-over in response to switching signal RFSW so that the video signal from the area AV of each track is supplied to video signal system 50 and the PCM data from the area AP of each track is supplied to PCM signal system 60.

In video signal system 50, the video signal is demodulated and then delivered to an output terminal 52 as the video output $V_{out}$.

On the other hand, in PCM signal system 60, the reproduced PCM data is supplied through a playback equalizer circuit 63 and a limiter circuit 64 to a bit synchronizing circuit 65. This bit synchronizing circuit 65 is formed of a D-type flip-flop circuit 66 and a PLL (phase locked loop) circuit 67. From D-type flip-flop circuit 66, there is derived the data "1" or "0" modulated as mentioned before. The resulting data is supplied to PCM audio signal processor 62 in which it is error detected, error corrected and so on, and thereafter it is re-converted to left and right channel analog audio signals. These left and right channel analog audio signals $AU_{out}$ are provided at output terminals 68L and 68R, respectively.

The switching circuit 35 is changed over from its normal position engaging contact N to a position engaging a contact D during scanning of an index area. Further, a switching circuit 36 is adapted to selectively apply to contact D either an index signal or an erasing signal in response to a switching signal SW when the index signal is inserted or erased, respectively.

In the embodiment illustrated on FIG. 6, the index signal applied to contact $I_{dx}$ of switching circuit 36 is comprised of coded digital data which results from coding the absolute address on the tape. For this purpose, a coding data generating circuit 71 generates such coding data or coded index signal in response to an absolute address signal ADS applied to circuit 71 automatically or manually as an input signal thereto. This absolute address signal ADS may be the current time indicated by a clock, by way of example. As an erasing signal applied to contact $E_r$ of switching circuit 36, there is used a single tone or frequency signal having a frequency of 5.8 MHz and provided by an oscillator 72.

Figure 3:
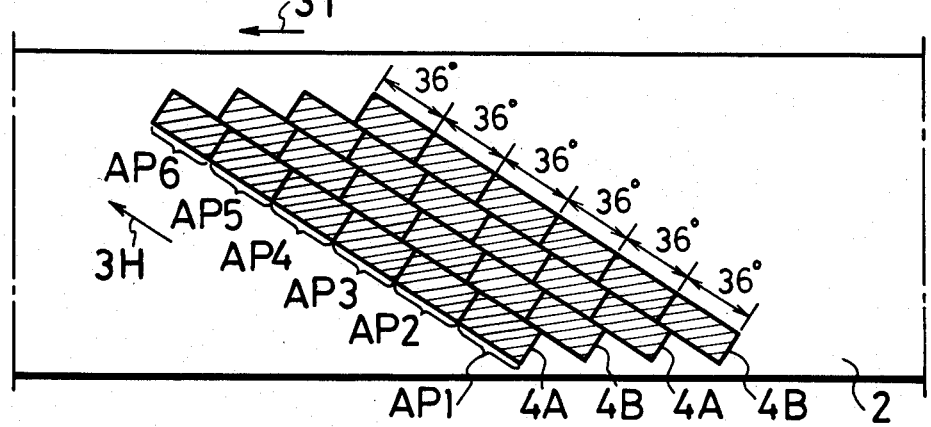

By way of example, coding data generating circuit 71 may generate the index signal as a block of data arranged in the same way as each block of the PCM data shown in FIG. 7. If the block data constituting the coded index signal is arranged in the same way as the coding format of the PCM data, the integrated circuit (IC) arrangements for coding and decoding both the coded index signal and the PCM data can be constructed the same. The contents of the coding data can be any of the following: a signal indicative of a starting point of a recorded event or program in a channel, the channel number, the tape speed used in recording, time data, such as, the hour, minute and second, data identifying whether the sound is a stereo broadcast or bilingual broadcast when recording a television program in a normal mode, data identifying whether a PCM audio signal is recorded together with a video signal in the same fashion as shown in FIG. 2, that is, in the normal PCM mode, or whether only a PCM audio signal is recorded in the multi-PCM mode as shown in FIG. 3, and information indicating the running direction of the tape, since the tape can be transported in the forward direction or in the reverse direction in the case of the multi-PCM mode.

The error correction codes or parity words P and Q are added to a block of the coded index signal data so that the latter can be extracted positively and accurately upon reproducing or playback. These parity words P and Q are generated in a way that is different from that in which the parity words P and Q are generated for the PCM audio data.

Figure 4:
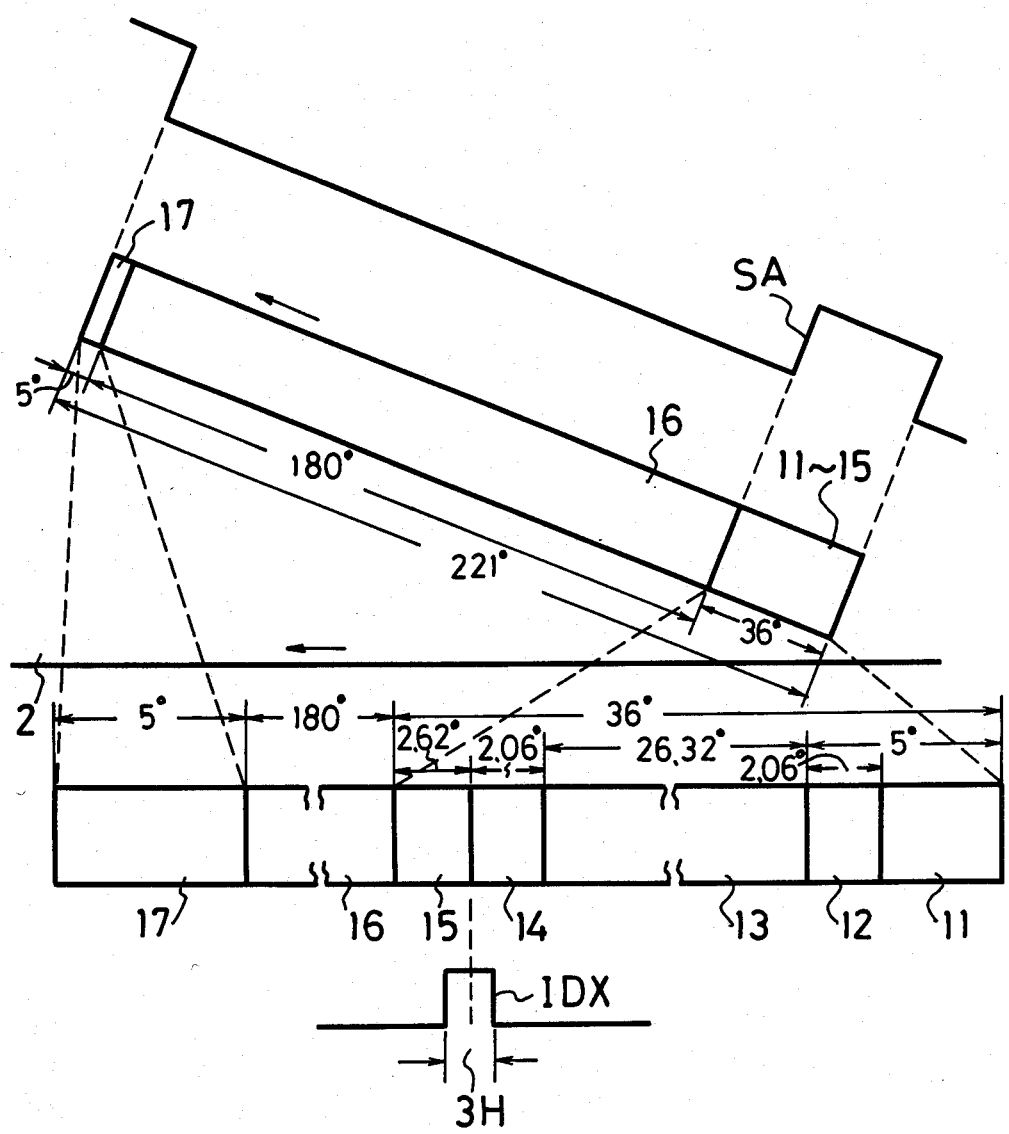
FIGS. 4 and 5 are schematic diagrams showing track formats used in the recording modes of FIGS. 2 and 3, respectively.
Figure 5:
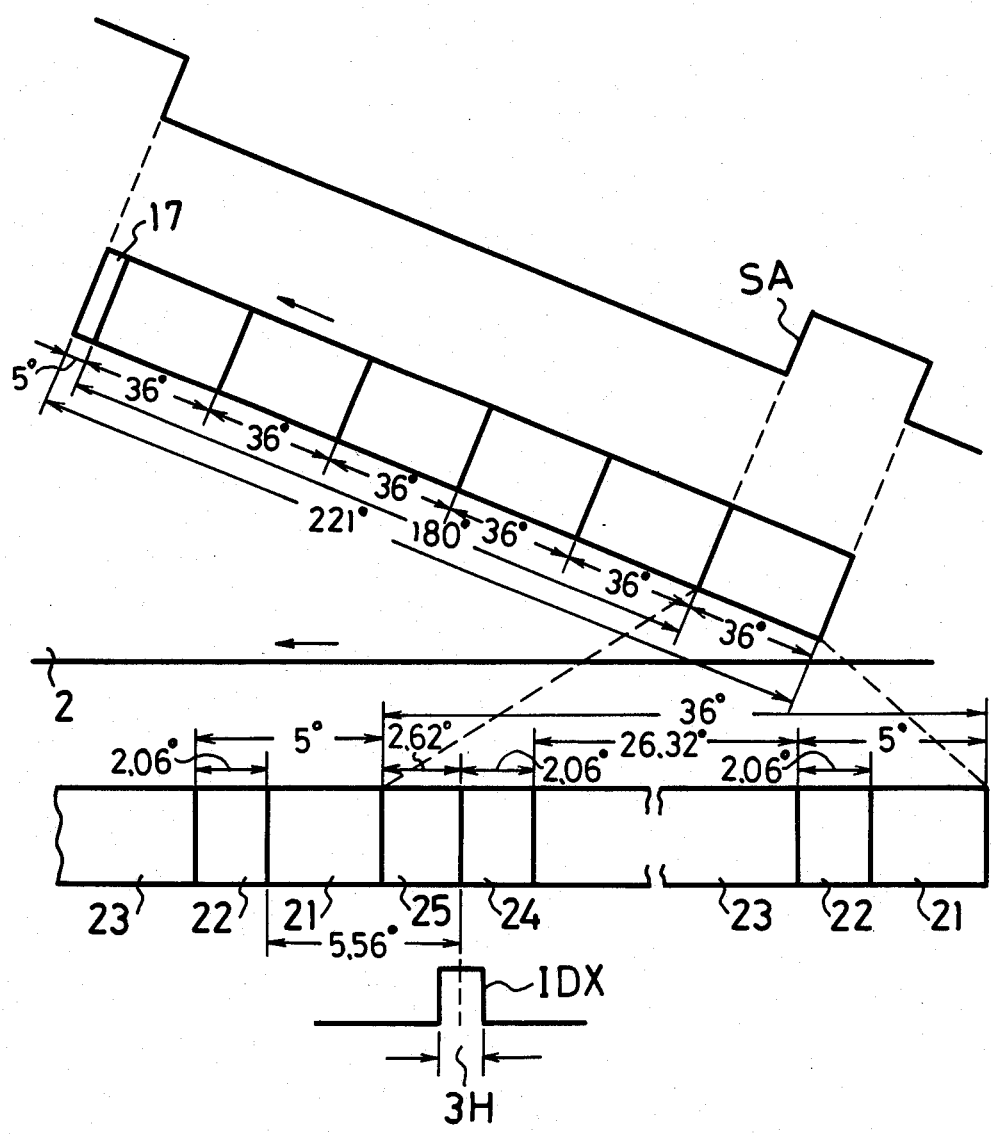

During recording, or when the apparatus is in the playback mode to play back the signal while a new index signal $I_{dx}$ is written in a limited area between postamble area 14 or 24 and guard band area 15 or 25, as shown on FIGS. 4 or 5, or when the index signal is to be erased, an index area signal is generated whenever a rotary head scans the area of a track which is to receive, or contains an index signal. This index area signal is also used for extracting the index signal from the output of a rotary head during playback.

In the embodiment shown on FIG. 6, the index area signal is formed from switching signal RFSW. More particularly, switching signal RFSW (FIG. 8C) from switching circuit 34 is supplied to a rising and falling or zero-crossing detecting circuit 81 in which each of the leading and trailing edges of switching signal RFSW is detected to cause the output of a detected pulse SD. A monostable multivibrator 82 is triggered by detected pulse SD (FIG. 8E) from detecting circuit 81 to thereby generate a pulse M1 (FIG. 8F) which is delayed by a delay time corresponding to the time from the moment of head switching up to a time a little before the rotary head attains a starting position of the postamble area 14 or 24. This pulse M1 triggers a monostable multivibrator 83 to thereby generate an index area signal M2 (FIG. 8G).

The index area signal M2 thus obtained is supplied through a gate circuit 84 to switching circuit 35 as a switching signal for the latter so that switching circuit 35 is changed-over by index area signal M2 from engagement with contact N connected to PCM audio signal processor 62 to engagement with contact D connected to switching circuit 36. Index area signal M2 passed through gate circuit 84 is also supplied through OR gate 42 to the recording and reproducing change-over switching circuits 31A and 31B so that during each period when an index area is scanned by a rotary head HA or HB, switching circuits 31A and 31B are engaged with the respective recording terminals REC.

Accordingly, if, in the reproducing mode of the 8 mm video tape recorder, an index signal is to be recorded or inserted, switching circuit 36 is changed-over to the position opposite the illustrated position, that is, to engage its contact $I_{dx}$, and digital data coded with the absolute address position and the like, is recorded in the respective track as the index signal during the postamble interval specified by index area signal M2. On the other hand, if the index signal is to be erased, switching circuit 36 is disposed in the illustrated position, that is, engages its contact $E_r$, so that the erasing signal having the frequency of 5.8 MHz is applied to the head HA or HB during the period specified by the index area signal M2 and hence the previously recorded coded or other index signal is erased.

The gate circuit 84 is adapted to control the recording time and the erasing time, and, hence, the number of tracks in which the index signal is recorded or erased. A control signal GT is applied to gate circuit 84 for opening the latter for a period of, for example, 3 seconds to 10 seconds, to thereby write or erase the index signal in the tracks scanned during that time. This control signal GT may be generated automatically or manually depending on the VTR to which the invention is applied.

In the recording mode, gate circuit 84 is normally maintained opened by the control signal GT to thereby record the coded index data or the erasing signal having the frequency of 5.8 MHz in the index area of each track.

Accordingly, in the recording mode, the signal M2 is supplied to switching circuit 35 as the index area signal for each track being scanned, whereby, when the index signal is to be recorded, the coding data is recorded, whereas, in other cases, the postamble signal having the frequency of 5.8 MHz is recorded.

In the multi-PCM mode in which a video signal is not recorded but only the PCM audio signal is recorded, switching circuit 34 is changed-over to engage its contact M, and the index signal can be recorded, erased and inserted or re-recorded in the same way as described above for the normal PCM mode by suitably changing the switching circuit 36. In the multi-PCM mode, phase-shifter 45 is suitably controlled to select the segment track area AP1–AP6 in which the index signal is to be recorded or erased.

The coded index signal thus recorded is reproduced in the following manner in a high-speed search mode:

The reproduced outputs of heads HA and HB are alternately applied through amplifiers 47A and 47B and change-over switch 33, during scanning of the track area AP or $AP_1$–$AP_6$, and then through equalizer 63 and limiter 64 to D-type flip-flop 66. The resulting signal from D-type flip-flop circuit 66 is supplied through a gate circuit 91 to an index decoder 92.

The index area signal M2 is further supplied from monostable multivibrator 83 to a gate signal generating circuit 93 and a signal VS corresponding to the tape speed used in the high speed search mode is supplied to gate signal generating circuit 93 for controlling the latter. Accordingly, from gate signal generating circuit 93, there is derived a gating signal M2' having a pulse width which is changed in response to changes in the tape speed and which opens gate circuit 91 during a period when a rotary head HA or HB is scanning an index area. Since gate circuit 91 is opened during a period when an index area is scanned, the index data in such area is reproduced by the rotary head HA or HB and is supplied through gate circuit 91 to index decoder 92 in which it is demodulated and then decoded. On the basis of the resulting decoded output $IDX_{out}$, the 8 mm video tape recorder is controlled to carry out a predetermined search operation, for example, to locate a desired recorded tune or program identified by a particular coded index signal.

When the index signal is to be inserted in the reproducing or playback mode, that is, while reproducing the recorded signal, it is alternatively possible that the index area signal is not formed from the switching signal RFSW for the rotary heads HA and HB, but rather is formed on the basis of, for example, the block address ADRS (FIG. 7) included in the reproduced PCM audio data.

Further, this invention is not limited in its application to an 8 mm video tape recorder but can be applied to various kinds of rotary head-type recording and/or reproducing apparatus.

Figure 9:
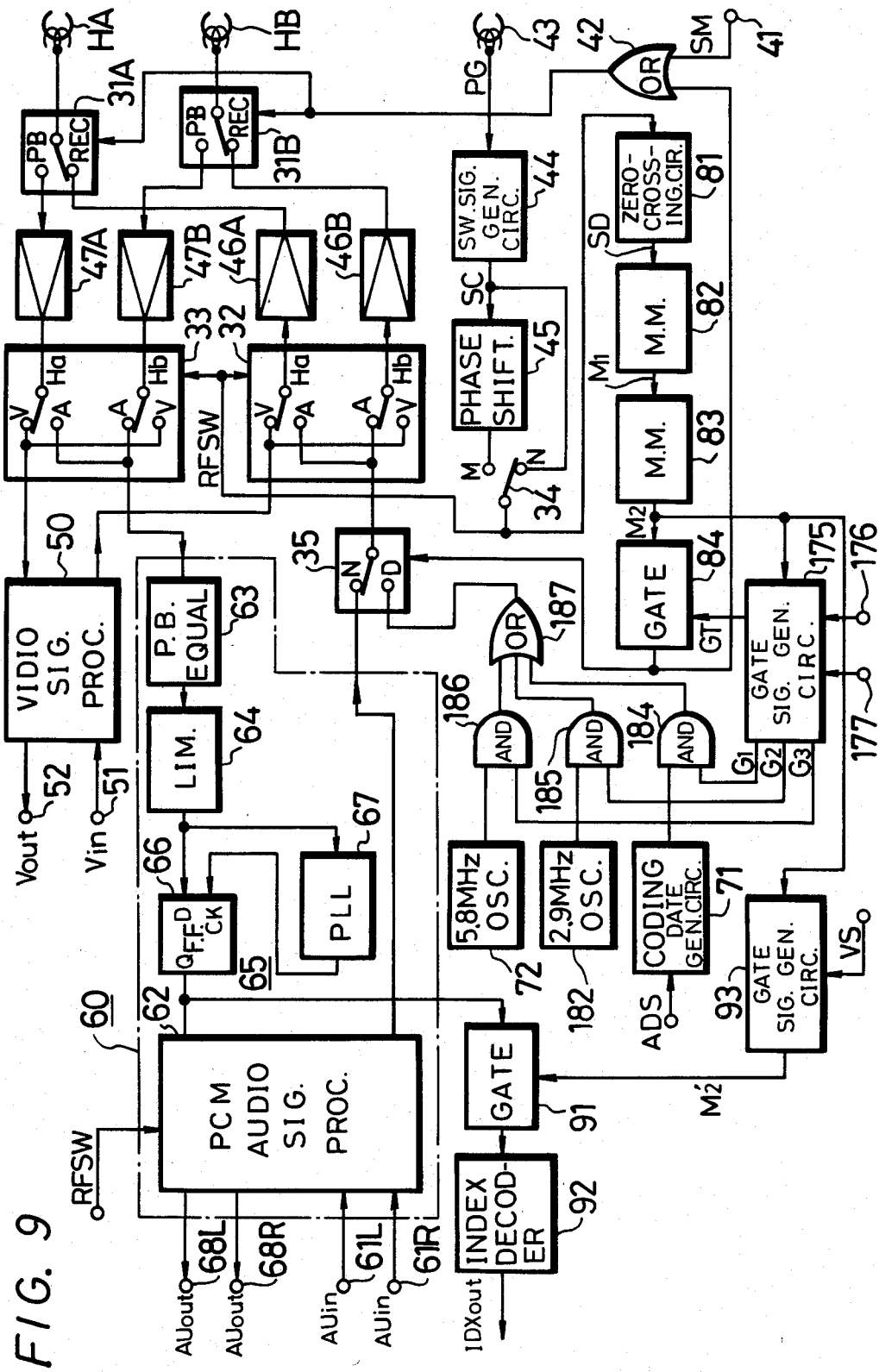
FIG. 9 is a schematic block diagram showing an apparatus for recording and reproducing an information signal according to another embodiment of the present invention.

Referring now to FIG. 9, it will be seen that, in another embodiment of the present invention there illustrated, an index signal having a single tone frequency so that it can identify only the relative position of the tape, as in the prior art, is recorded together with the coded index signal indicative of the absolute address and the like. More particularly, in accordance with this embodiment of the invention, the coded index signal and the single frequency index signal are recorded alternately either in the same track or in successive tracks. As a result of the foregoing, the apparatus according to this embodiment can be compatible with a recording and/or reproducing apparatus in which only the relative position information is recorded and/or reproduced as a single frequency index signal.

In FIG. 9, the parts corresponding to those described with reference to FIG. 6 are identified by the same reference numerals and will not be described again.

In the embodiment shown in FIG. 9, index area signal M2 (FIG. 10A) is supplied through gate circuit 84 to switching circuit 35 and, during the period of scanning of an index area, switching circuit 35 is changed-over from engagement with contact N connected to the PCM audio signal processor 62 to engagement with contact D which is connected with an OR gate circuit 187. The index area signal M2 passed through the gate circuit 84 is also supplied through OR gate 42 to recording and/or reproducing change-over switching circuits 31A and 31B so that, during scanning of an index area, switching circuits 31A and 31B are positioned to engage the respective recording terminals REC.

Accordingly, when an index signal is to be inserted and/or erased while recording and/or reproducing the recorded signal, the signal from OR gate circuit 187 is written in the track during scanning of the portion of the postamble area specified by index area signal M2 similarly to the manner described with reference to the embodiment of FIG. 6.

The gate circuit 84 is maintained open by a gating signal GT from a gate signal generating circuit 175 when in the recording mode. However, during insertion or erasing of the index signal in the after-recording mode, that is, while the audio and/or video signal is being reproduced, gate 84 is opened for a predetermined time period, for example, 3 to 10 seconds. In other words, gate circuit 84 controls the time for writing and erasing the index signal.

From OR gate circuit 187, there is derived the index signal or the erasing signal. More specifically, a circuit 71 is provided for generating a coded index signal representing the absolute address and other information and which is constructed and operated in the same way as the circuit 71 in FIG. 6. Further, an oscillator 182 generates a single frequency signal of 2.9 MHz indicative of data of all "0"s, and constituting a single frequency index signal providing only relative position information. Oscillator 72, as before, generates an erasing signal having a frequency of 5.8 MHz, that is, the frequency of the postamble signal.

The coding data or coded index signal from the coding data generator 71 is supplied to a first input terminal of an AND gate 184, and the signals having the frequency of 2.9 MHz and 5.8 MHz from the oscillators 182 and 72, respectively, are supplied to first input terminals of AND gates 185 and 186, respectively.

Gating signals G1, G2 and G3 from gate signal generator 175 are supplied to second input terminals of AND gates 184, 185 and 186, respectively. Gate signal generator 175 is supplied with index area signal M2 from monostable multivibrator 83, a recording and/or reproducing mode selection signal from a terminal 176 and an index signal recording and/or erasing selection signal from a terminal 177.

As earlier noted, in the normal recording mode, gate signal generator 175 generates gating signal GT so as to always open gate circuit 84. In the index signal recording mode, normal recording is carried out and also the index signal is recorded. More particularly, during a period from the leading edge of the index area signal M2 (FIG. 10A) to the end of the first half of the index area period $\tau$, gating signal G1 (FIG. 10B) from generator 175 becomes "1" so that AND gate 184 is opened; and, during the second half of the period $\tau$, gating signal G2 (FIG. 10C) becomes "1" so that AND gate 185 is opened. Accordingly, the coded index signal or coding data from generator 71 is recorded in the first half-portion of the index area IDX, as at 100 on FIG. 11, while the single frequency index signal having the frequency of 2.9 MHz is recorded in the second half portion of the index area IDX, as at 101 on FIG. 11. In this case, a coded index signal or coding data comprised of about two blocks of data is recorded in the respective half-portion 100 of the index area of each track scanned while gate 84 is open.

In the reproducing mode, when a switch (not shown) for allowing the insertion or after-recording of the index signals is turned ON, the only difference from the above-described index signal recording in the normal recording mode resides in the fact that gating signal GT becomes "1" for only 3 to 10 seconds to thereby open gate circuit 84 during that time period. However, as in the normal recording mode, the gating signals G1 and G2 become "1" during the first and second halves, respectively, of the index area interval $\tau$ with the result that the coded index signal or coding data and the single frequency index signal having the frequency of 2.9 MHz are recorded in respective half-portions 100 and 101 of the index area in each track for the interval of 3 to 10 seconds during which gate circuit 84 is open.

While in the recording mode, index signal erasing may be effected. In this case, gate circuit 84 is maintained open by gating signal GT and only gating signal G3 (FIG. 10D) becomes "1" during each index area period $\tau$, so that AND gate 186 is opened during this period $\tau$. Hence, the signal having the frequency of 5.8 MHz is supplied from oscillator 72 and recorded in the index area as the postamble signal.

While in the reproducing mode, index signal erasing is effected in the same manner as indicated above for the recording mode, with the only difference being that gate circuit 84 is opened at a specified place on the tape for 3 to 10 seconds to permit the signal having the frequency of 5.8 MHz to be written in the index area of each track scanned during such time period and thus the index signals are erased from such index area.

The coded index signals thus recorded are reproduced in the high speed search mode in a manner similar to that described above with reference to FIG. 6. In the embodiment of FIG. 9, it is possible to also similarly detect the single frequency index signals for use in the search mode, as in the prior art.

Although, in the embodiment of FIG. 9, the coded index signal and the single frequency index signal are recorded in the first and second divided portions 100 and 101 of a single index area, the recording of the coded and single frequency index signals is not limited to that arrangement.

Alternatively, as shown on FIG. 12, the coded and single frequency index signals may be alternately recorded in the index areas of successive slant tracks, as at 100' and 101', respectively. In order to effect such modification of the embodiment shown in FIG. 9, each of the gating signals G1 and G2 is formed with a pulse width $\tau$ which is the same as that of the index area signal M2. These two gating signals G1 and G2 are alternately supplied to AND gates 184 and 185 during successive field periods in response to, for example, the head switching signal RFSW.

In the apparatus according to the present invention as set forth above, since data representing the absolute address is used as the coded index signal, if this coded data is searched for in the high-speed search mode and then decoded, a desired track position on the tape can be detected easily and rapidly. Therefore, unlike the case where only the relative positional information is used, it is not necessary to rewind the tape to the tape head end in order to detect or measure the position from the tape head end.

Further, since apparatus according to the present invention, can employ the coded index signal and also the single frequency index signal only providing relative positional information, and which are alternately recorded periodically, there is compatibility with the recording and/or reproducing apparatus in which only the relative positional information is used as the index signal.

Although preferred embodiments of the invention have been described in detail with reference to the accompanying drawings, it will be apparent that the invention is not limited to those precise embodiments, and that many modifications and variations could be effected therein by one skilled in the art without departing from the spirit or scope of the invention as defined by the appended claims.

What is claimed is:

1. An apparatus for recording and/or reproducing, in successive slant tracks on a record tape, an information signal comprised of at least an audio signal and an index signal for use in controlling transportation of the tape, comprising:
    audio signal processing means for converting an input audio signal to a digitized form in which the audio data for a predetermined length of time is grouped as a plurality of data blocks;
    transducer means connected to said audio signal processing means for recording and/or reproducing said grouped data blocks containing the digitized audio signal for said predetermined length of time in a first part of a respective slant track on the tape;
    index signal generating means including means for generating a coded index signal to indicate respective input information;
    index area signal generating means for providing an index area signal in predetermined timed relation to scanning by said transducer means of said first part of each said slant track; and
    control means responsive to said index area signal for supplying said coded index signal to said transducer means for recording by the latter in a second part of said respective slant track which is located adjacent an end of said first part of said respective slant track.

2. The apparatus according to claim 1; in which said input information is an absolute-tape position address counted from a predetermined reference position on the record tape.

3. The apparatus according to claim 1; in which said input information is a time code indicating the running time for transportation of the tape from a reference position thereon.

4. The apparatus according to claim 1; in which said input information is a mode signal indicating the speed at which the tape is transported during recording of said digital audio signal thereon.

5. The apparatus according to claim 1; further comprising means for generating an erasing signal; and means for supplying said erasing signal to said control means in place of said coded index signal so that said transducer means employs said erasing signal in response to said index area signal for erasing a coded index signal previously recorded in said second part of a slant track.

6. The apparatus according to claim 5; further comprising means permitting application of said index area signal to said control means over a period of time corresponding to the scanning of a number of said slant tracks by said transducer means, whereby a coded index signal is recorded in, or erased from said second part of each of said number of slant tracks scanned during said period of time.

7. The apparatus according to claim 1; further comprising means permitting application of said index area signal to said control means over a period of time corresponding to the scanning of a number of said slant tracks by said transducer means, whereby a coded index signal is recorded in said second part of each of said number of slant tracks scanned during said period of time.

8. An apparatus for recording and/or reproducing, in successive slant tracks on a record tape, an information signal comprised of at least an audio signal and an index signal for use in controlling transportation of tape, comprising:
    audio signal processing means for converting an input audio signal to a digitized form in which the audio data for a predetermined length of time is grouped as a plurality of data blocks;
    transducer means connected to said audio signal processing means for recording and/or reproducing said grouped data blocks containing the digitized audio signal for said predetermined length of time in a first part of a respective slant track on the tape;
    index signal generating means including means for generating a coded index signal to indicate respective input information, means for generating a signal frequency index signal for controlling tape transportation, and selecting means for alternatively applying said coded index signal and said single frequency index signal to said control means;
    index area signal generating means for providing an index area signal in predetermined timed relation to scanning by said transducer means of said first part of each said slant track; and
    control means responsive to said index area signal for supplying said coded index signal to said transducer means for recording by the latter in a second part of said respective slant track which is located adjacent an end of said first part of said respective slant track.

9. The apparatus according to claim 8; in which said selecting means alternately applies said coded index signal and said single frequency index signal during scanning by said transducer means of successive first and second areas of said second part of each slant track for which said index area signal is generated.

10. The apparatus according to claim 9; in which said selecting means includes OR logic msans having an output connected to said control means, first AND gate means connected between said means for generating the coded index signal and said OR logic means, second AND gate means connected between said means for generating said single frequency index signal and said OR logic means, and gate signal generating means responsive to said index area signal for providing first and second gating signals for enabling said first and second AND gate means, respectively, during first and second portions of said index area signal which respectively correspond to said first and second areas of said second part of the scanned slant track.

11. The apparatus according to claim 8; in which said selecting means alternately applies said coded index signal and said single frequency index signal during scanning by said transducer means of said second parts of successive slant tracks, respectively.

12. The apparatus according to claim 8; further comprising means for generating an erasing signal; and in which said selecting means is further operative for selectively supplying said erasing signal to said control means in place of said coded and single frequency index signals so that said transducer means employs said erasing signal in response to said index area signal for erasing any coded or single frequency index signal previously recorded in said second part of a slant track.

13. The apparatus according to claim 12; in which said erasing signal has a frequency substantially higher than the frequency of said single frequency index signal.

14. The apparatus according to claim 1; in which said transducer means includes rotary head means; and in which said index area signal generating means includes means for generating a signal indicative of a rotary phase of said rotary head means, and means for providing said index area signal from said signal indicative of the rotary phase of the rotary head means.

* * * * *